United States Patent [19]

[11] Patent Number: 4,727,012

[45] Date of Patent: Feb. 23, 1988

Quella et al.

[54] METHOD OF MANUFACTURE FOR PRINT HEADS OF INK JET PRINTERS

[75] Inventors: Ferdinand Quella, Neubiberg; Hans Hadersbeck, Munich; Ernst Goepel, Germering, all of Fed. Rep. of Germany

[73] Assignee: Siemens Aktiengesellschaft, Berlin & Munich, Fed. Rep. of Germany

[21] Appl. No.: 788,947

[22] Filed: Oct. 18, 1985

[30] Foreign Application Priority Data

Oct. 25, 1984 [DE] Fed. Rep. of Germany ....... 3439125

[51] Int. Cl.[4] ........................ G03C 5/00; G01D 15/18

[52] U.S. Cl. .................................... 430/320; 430/325; 430/326; 430/327; 430/394; 346/1.1; 346/140 R

[58] Field of Search ................ 346/140 R, 1.1, 140 A; 430/320, 394, 325, 326, 322, 312, 327

[56] References Cited

U.S. PATENT DOCUMENTS 4,096,626 6/1978 Olsen et al. .......................... 29/846
4,158,847 6/1979 Heinzl et al. .................. 346/140 R
4,392,145 7/1983 Parkola .......................... 346/140 R
4,412,224 10/1983 Sugitani .............................. 346/1.1
4,414,552 11/1983 Bergman et al. .................... 346/1.1
4,417,251 11/1983 Sugitani .............................. 346/1.1
4,437,100 3/1984 Sugitani et al. ...................... 346/1.1
4,455,560 6/1984 Louzil ............................ 346/140 R
4,504,844 3/1985 Ebi et al. ......................... 346/140 R

*Primary Examiner*—John E. Kittle
*Assistant Examiner*—José G. Dees
*Attorney, Agent, or Firm*—Hill, Van Santen, Steadman & Simpson

[57] ABSTRACT

A print head of an ink jet printer is formed by a multilayer structure composed of a plurality of individual photoplastic films, segments of such films having a prescribed contour being removed by a photo-chemical treatment being defined on the individual photoplastic films in successive lamination procedures by the use of masks through which such photoplastic films are exposed. Passivation of unexposed films takes place after every lamination procedure by applying a light-absorbing solution. A three-dimensional structure is built up employing photoplastic films having thicknesses in the range between 10 μm to 50 μm and one or more masks having light transmissive regions which define a desired cross-section for the interior passages of the print head.

11 Claims, 10 Drawing Figures

METHOD OF MANUFACTURE FOR PRINT HEADS OF INK JET PRINTERS

BACKGROUND OF THE INVENTION

1. Field of the Invention

The present invention relates to print heads for ink printing devices, and more particularly to print heads for printing devices of the ink jet printer type.

2. Prior Art

In an ink jet printer, an ink supply is provided communicating with the discharge opening by way of ink channel, from which the ink is ejected in the form of droplets under the influence of a transducer. For the practical operation of such devices, as well as for their functional reliability, special requirements are important. For example, the individual ink channels of the print head which are in communication with an ink supply system for supplying the ink to the discharge openings must be precisely dimensioned in their cross-section and free of any abnormality in the vicinity of the discharge openings. Even minute irregularities can lead to a modification of the individual ink jets, or to a failure of such jets. In print heads employing a large number of jets, these problems increase considerably, because a large number of jets has special need of print heads in which the ink channels and discharge openings are small and precise, in order to give small droplets of uniform size from each discharge opening.

In accordance with the method described in German Pat. No. OS2543451, a pre-assembled unit incorporating a plurality of needles together with drive elements for the droplet ejection are inserted into an injection or casting mold before casting the print head. The ink channels are fashioned in the head after removal of the needles. This method requires a very precise assembly of the needles and associated apparatus, and must be executed by largely manual means. In order to guarantee a completely smooth surface on the inside of the ink channels, the removal of the needles must take place with great precision.

It has also been proposed, in German Pat. No. OS3108206 to construct a print head by forming ink channels and an ink feed chamber as recessed in a photosensitive layer. The photosensitive layer applied to a substrate is covered with a photomask made up of light impermeable regions to define the ink channels in the ink feed chambers. The desired recesses are then formed by means of exposure to radiation and subsequent treatment with solvent. A cover plate completes the overall arrangement. Only relatively simply structures however can be fashioned with this method. The particularly high demands which are made on the shape of the ink channels for precision in print heads for ink jet printers cannot be satisfied with this method.

It is accordingly desirable to provide a method for the manufacture of print heads which allow formation of ink channels in an arbitrary three dimensional form under circumstances which allow for automation and relatively low manufacturing costs.

BRIEF DESCRIPTION OF THE INVENTION

It is a principle object of the present invention to provide a method of making a print head for an ink jet printer which allows the ink channels to be made in arbitrary three-dimensional form, while allowing for automation of the process, and relatively low manufacturing costs.

This is achieved in the present invention by employing a method using a plurality of photoplastic films applied to a carrier in successive lamination procedures, with masking and exposure of each individually for rendering a portion of the photosensitive material soluble. Dissolution of portions of a plurality of the lamina achieves precise control of the size and shape of the ink channels and the discharge opening.

Use of the present invention achieves the advantage of greatly improving the fine structure of the formation of the ink channels. This method opens up the possibility of producing ink channels having a cross-section which changes, so it tapers in the direction toward the discharge opening, without significant increase in manufacturing costs.

These and other objects and advantages of the invention will become manifest by an inspection of the following description and the accompanying drawings.

BRIEF DESCRIPTION OF THE DRAWINGS

Reference will now be made to the accompanying drawings in which:

FIGS. 1A–F show in schematic form individual steps for manufacturing the print head in accordance with the present invention;

DESCRIPTION OF THE PREFERRED EMBODIMENTS

Figure 1A:
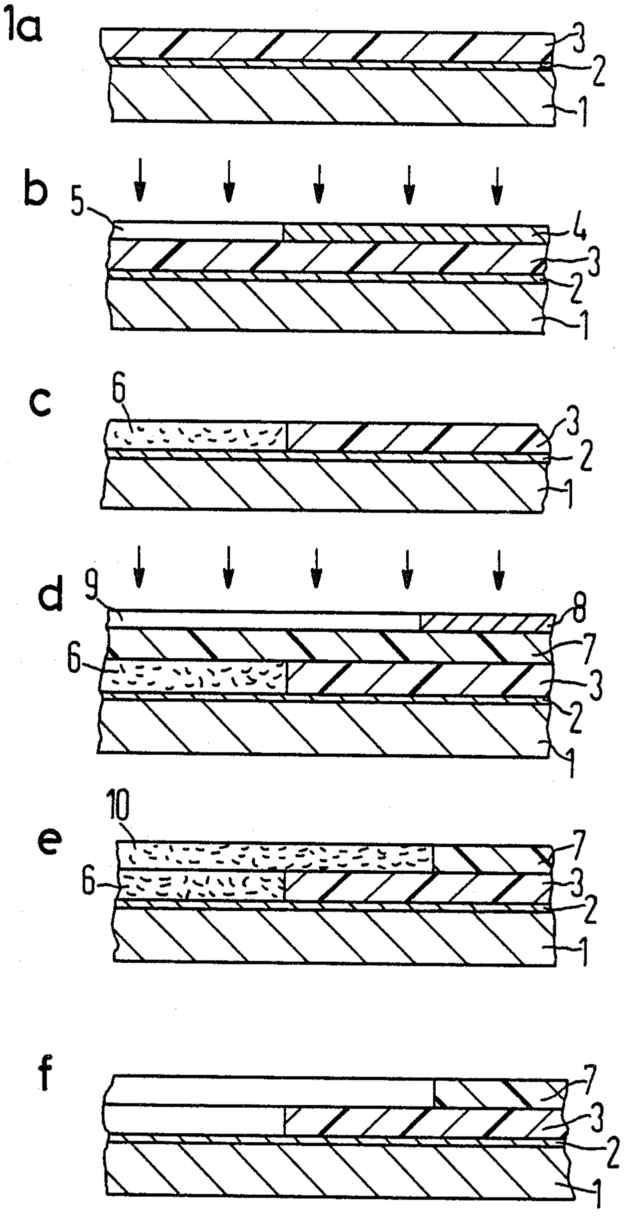

FIG. 1 illustrates a sequence of steps carried out in practicing the present invention. A thin plastic coating 2 is first applied to a carrier 1 (FIG. 1A), and this plastic coating is overlaid by a photoplastic film 3. The thin plastic coating 2 serves as a protective layer intermediate between the carrier 1 and the ink used with the finished product. The ink is in contact with the layer 2 but not the carrier 1. The layer 2 also serves as an adhesive between the carrier 1 and the photoplastic film 3.

Preferably the carrier 1 is formed of metal or of a synthetic compound such as a polybutylene terephthalate compound. Favorable results are achieved when the carrier is formed with a thickness of about 0.2–1 mm and has a area of about 5×10 cm. The film 3 is applied to the layer 2 in a first lamination procedure, and is then covered with a mask 4 and radiated with ultraviolet light (FIG. 1B).

The mask 4 comprises a light transmissive region 5 of a defined contour, to allow the ultraviolet light to reach the film 3 in the vicinity of the region 5 but not elsewhere. The action of the ultraviolet light is to make the film 3 soluble after exposure, so that this portion of the film 3 can be removed by a solvent.

After exposure (but before dissolving any portion of film 3), the mask 4 is removed, and the free surface of the film 3 is passivated, for example by means of a light-absorbing dyestuff solution or toner powder. The passivation may be applied to a laminated part of the free surface if desireable. This passivation prevents subsequent exposure of other layers described hereinafter from affecting the layer 3.

In a further lamination procedure, a second photoplastic film 7 is applied to the first photoplastic film 3 and it is covered with a mask 8 and exposed (FIG. 1D). The mask 8 again includes a light transmissive region 9 having a defined contour, through which the defined segment 10 of the photoplastic film 7 corresponding to this region is exposed. In this way a region of the second photoplastic film 7 is rendered soluble, as described above in connection with region 6 of film 3.

The region 9 of the mask 8, and accordingly the segment 10, may differ with respect to length and width from the region 5 defined by the mask 4. In this way, the length and width of the region 10 may vary relative to the region 6, so that a volume build up from successive regions similar to the region 6 and 10 may have an arbitrary shape, corresponding at each horizontal plan to a sectional contour of an individual mask. In this way a hollow three-dimensional shape is built up by applying successive layers of photosensitive materal and treating them as described above.

The exposed free surface of the photoplastic film 7 is in turn passivated after the mask 8 has been removed.

The soluble regions 6, 10 etc. may be dissolved either after each lamination procedure, or after two or more of the lamination procedures are accomplished. In the illustration of the FIG. 1, the dissolution of the region 6 and 10 occurs after the second lamination (FIG. 1F). This results in the removal of the soluble portions 6 and 10 in order to define a three-dimensional object having a hollow portion of a predetermined arbitrary shape. This takes place entirely by means of known photolithographic techniques, involving lamination, masking, exposure, and passivation. These procedures are successively repeated, together with development by dissolving the selectively exposed portions of the photoplastic films, either after each lamination procedure or after a plurality of lamina have been processed. The cavities arising from the layered structure thus produced makes it possible to form a three-dimensional channel and jet structure for the print head of an ink jet printer.

Figure 2:
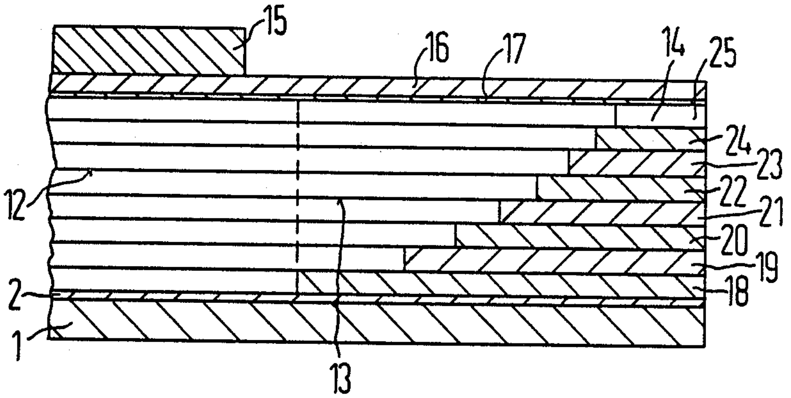
FIG. 2 shows a longitudinal cross-sectional view of one portion of a print head manufactured in accordance with the present invention.
Figure 3:
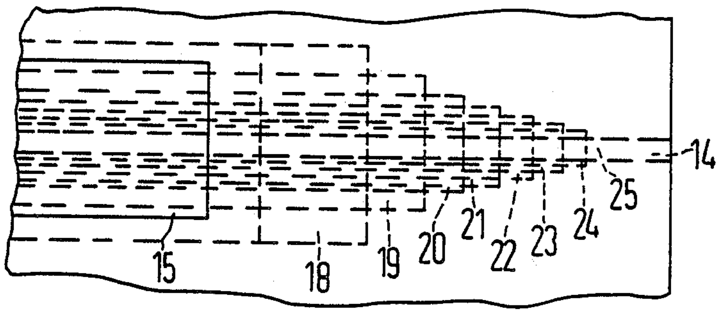
FIG. 3 is a plan view of the apparatus of FIG. 2.

FIGS. 2 and 3 illustrate a vertical cross-section and plan view of a portion of the print head constructed in accordance with the described method. In FIG. 2, the region 12 is provided as an ink chamber, with an ink channel 13 communicating between the chamber 12 and the discharge opening 14. These regions are filled with ink during operation of the print head. The print head works in accordance with the so-called underpressure method, which allows ink to feed freely from an ink reservoir disposed at a lower level toward the discharge openings in the ink channels. Under the influence of a transducer 15 adjacent the region 12, a pressure wave can be formed inside the ink chamber 12, propagating through the ink with the speed of sound and effecting the ejection of a small amount of ink in the form of an ink droplet at the jet discharge opening 14. The ink channel 13 tapers in the direction toward the discharge opening 14, in both height and width, as a result of the geometries of the mask used to expose the several photoplastic lamina 18–24 of which the apparatus of FIG. 2 is built up. As shown in FIG. 2, the ink channel 13 is increasingly constricted in height as the ink moves rightwardly. Also as shown in FIG. 3, the width of the ink channel 13 also decreases as the ink moves rightwardly toward the discharge opening 14.

A cover film 16 is provided for covering the uppermost photoplastic film forming the discharge opening 14, and the cover film 16 is preferably provided with a protective layer 17 for insulating the film 16 against direct contact by the ink within the regions 12, 13 and 14.

In the arrangement illustrated in FIGS. 2 and 3, the regions 12, 13 and 14 are formed by eight photoplastic films 18–25. Since photoplastic films are available in a thickness from about 10 μm through 50 μm, an ink channel up to 400 μm thick can be manufactured by using 8 layers of photoplastic film.

If desired, the carrier 1, or the cover film 16 may be provided with a pressure sensitive layer, so that a wright head having a double row of ink channels and discharge openings can be produced by joining together two print heads as illustrated in FIGS. 2 and 3. Ink can be supplied to an ink channel in the second row through an opening in the cover film.

The sealing of the wright head produced in accordance with the present invention is assured by the covering film 16, as well as the layers 2 and 17, and by use of the underpressure method. If desired, a temporary shield may be provided for covering the discharge openings during transport of the print head to prevent an accidental spill of ink during transport.

By use of the present invention, the regularity of the discharge openings can be assured. Typically these openings are very thin capillaries, especially in connection with wright heads having plural rows of discharge openings. Any roughness in the region of the discharge openings, which can result from a shearing or simple cutting operation, can interfere with proper operation of the print head. The present invention maintains a regularity of the geometry in the vicinity of the discharge openings, and completely avoids this problem.

Figure 4:
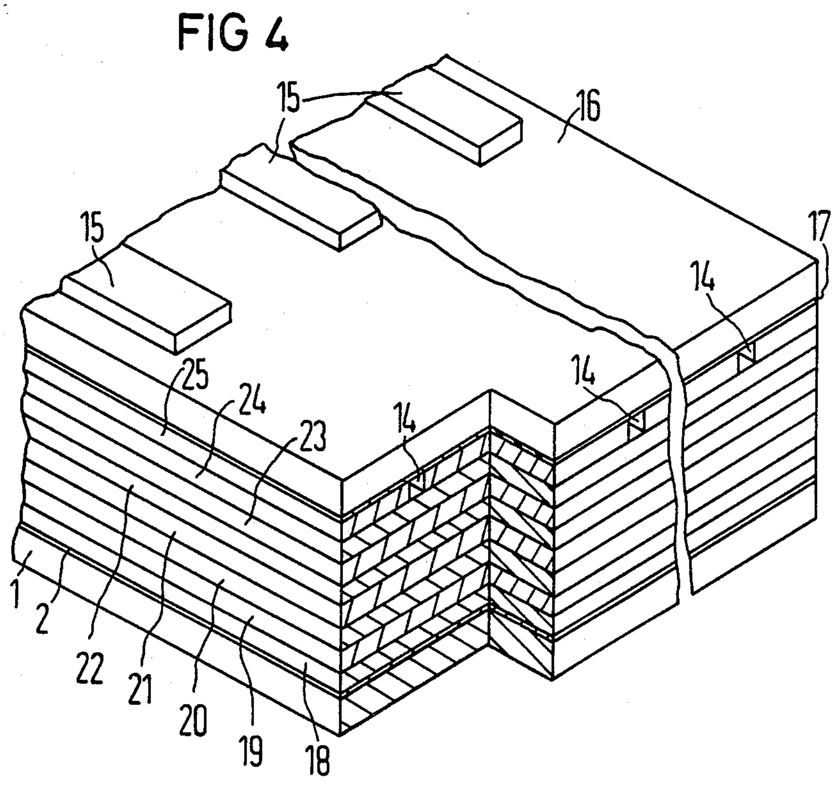
FIG. 4 is a prospective view of a multijet print head formed in accordance with the present invention.

In the embodiment illustrated in FIGS. 2 and 3, all of the photoplastic films 18–25 have the same thickness. It is also possible, however, to provide photoplastic films of different thicknesses, and to use a greater or smaller number of films in making up a print head. In this way it is possible to produce a very precise and very finely graduated three-dimensional structure of the ink channels and of the discharge openings. In practice the method is economical, since it admits of an extremely high degree of automation. For example, the superposition of the photoplastic layers, the placement of the mask, the exposure, and the subsequent removal of the mask and passivation of the photoplastic layers can take place without manual intervention by use of automatic machinery. In addition, a plurality of structures in accordance with the present invention can be constructed and produced with one work step on a carrier, and thus the present invention is particularly well suited for the manufacture of multijet print heads. In this case, the precision with which the desired ink channels and discharge openings can be manufactured has a particularly advantageous effect. FIG. 4 illustrates a partial prospective view of a print head constructed in accordance with the present invention. A corner of the print head is shown in section, to reveal the structure of the layers at a location spaced from one of the discharge openings. The structure of the print head of FIG. 4 is composed of 8 photoplastic layers constructed in the manner which has been described above in connection with FIGS. 1–3.

The present invention is not limited to the formation of ink channels and discharge openings as described above. In addition, the ink reservoir, with which the ink chamber communicates at the end of opposite the discharge openings can also be constructed in accordance with the present invention.

Also, the present invention is not limited to the use of photolithographic procedures in which the exposed film segments are removed, as described above. If desired, the so-called negative technique can be employed with the same advantages. In this case, it is merely necessary to employ photoplastic films which form so-called cross-linked film segments when exposed, so that the exposed film segments become insoluble, and the unexposed portion of the film may be dissolved and removed. The masks used with such a process correspond to the masks described above in connection with FIGS. 2 and 3, except that their transparent and opaque portions are interchanged.

In another embodiment of the present invention, a portion of the overall structure may be formed with a known technique such as injection molding, and combined with the laminar process of the present invention. This arrangement is advantageous because the numbers of layers to be applied can be reduced.

Figure 5:
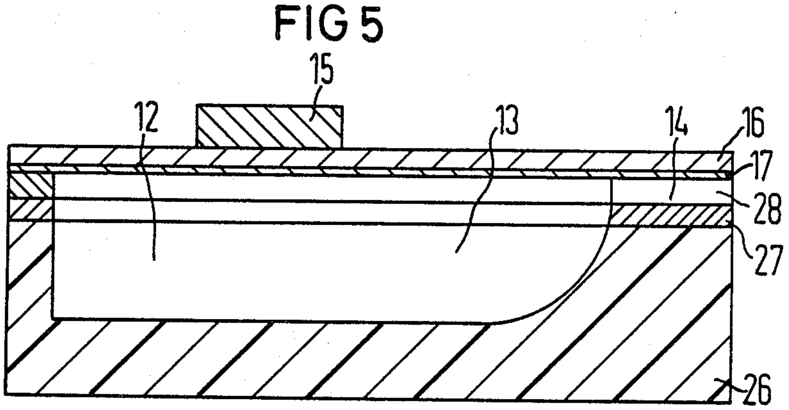
FIG. 5 is a cross-sectional view of an exemplary embodiment of the present invention in which a portion of the ink reservoir and channel is formed by molding techniques.

FIG. 5 illustrates an embodiment of a structure having an ink chamber 12 part of the ink channel 13 manufactured by an injection molding method in the conventional well known way. Only the parts of the ink channel 13 which have high tolerance requirements, and the discharge openings 14, are manufactured in accordance with the laminar process of the invention. To this end, a plurality of photoplastic films 27 and 28 are successfully applied to the injected plastic part 26, and are treated in the manner as described above, to closely control the geometry of the ink channels and opening, in the plane of the photoplastic film. The top of the arrangement is covered with the coated metal film 16, having a lining 17, to provide a closed system.

From the foregoing, it is apparent that the present invention furnishes an economical and effective manner producing print heads for ink jet printers with a high degree of control over their geometry of their ink passages and outlet openings. It will be apparent that various additions and modifications may be made without departing from the essential features of novelty thereof, which are intended to be defined and secured by the appended claims.

What is claimed is:

1. A method for manufacturing a print head for an ink jet printer, such print head having at least one ink chamber which is in communication with an ink supply and which discharges through an ink channel to a discharge opening from which a droplet of ink can be ejected in response to operation of a transducer element, comprising the steps of:

applying a plurality of photoplastic films to a carrier in successive lamination procedures, individually masking one or more of said photoplastic films between the individual lamination procedures with masks each having a light transmissive region overlapping a portion of the previous light transmissive region and assigned to a particular one of said photoplastic films, exposing said masked film to radiation, whereby a film segment for a dissolving treatment corresponding to said region is defined on the photoplastic film by means of said exposure, and treating said photoplastic films with a dissolving treatment for shaping the film segments after one or more of said lamination procedures.

2. A method according to claim 1 including the step of passivating said photoplastic films after a lamination procedure with a light-absorbing dyestuff solution.

3. A method according to claim 1 including the step of employing photoplastic films each having the same thickness.

4. A method according to claim 1 including the step of employing a plurality of layers of photoplastic film with different thicknesses in the range of 10 to 50 μm.

5. A method according to any of claims 1 through 3 wherein said carrier part has a planar surface, and including the step of applying said photoplastic films to said planar surface in successive lamination procedures, whereby ink channels are formed by the exposed and removed film segments.

6. A method according to claim 4 including the step of using a plurality of masks corresponding to a plurality of lamination procedures, one for each of said photoplastic films, the light transmissive regions of the individual masks comprising different dimensions such as to form a three-dimensional shape defined by increasing layer thicknesses of the structure, by shaping the corresponding film segments in the individual photoplastic films, such forming individual ink channels.

7. A method according to claim 6 wherein the dimension of said light transmissive regions of said masks which extends in the longitudinal direction of an ink channel increase with increasing layer thicknesses of the structure, whereby the clearances forming the ink channel taper in the direction toward the discharge opening.

8. A method according to any of claims 1 through 3 including the step of applying said photoplastic films in successive lamination procedures to a carrier having a recess forming an ink channel, whereby only that part of the ink channel which lies adjacent the region of the discharge opening is formed by the recesses in the photoplastic films.

9. A method according to any of claims 1 through 8 including the steps of defining the edges of the print head by corresponding film segments in said photoplastic films.

10. A method according to any of claims 1 through 8 including the step of subjecting said photoplastic films to a negative technique to dissolve unexposed portions of the film with a solvent.

11. A method according to any of claims 1 through 9 including the step of subjecting said photoplastic films to a positive technique to dissolve exposed portions of the film with a solvent.

* * * * *